US005768549A

United States Patent [19]

Ryu et al.

[11] Patent Number: 5,768,549

[45] Date of Patent: Jun. 16, 1998

[54] INPUT INTERFACE USING MULTIPLEX TYPE INPUT CIRCUIT

[75] Inventors: Kazunori Ryu; Nobuhiro Imaizumi, both of Shizuoka, Japan

[73] Assignee: Yazaki Corporation, Tokyo, Japan

[21] Appl. No.: 673,045

[22] Filed: Jul. 1, 1996

[30] Foreign Application Priority Data

Jun. 29, 1995 [JP] Japan .................................... 7-164248

[51] Int. Cl.[6] ........................................................ G06F 13/00

[52] U.S. Cl. ....................... 395/309; 395/750.01; 327/100

[58] Field of Search ..................................... 395/750, 309, 395/308, 750.01; 323/222; 327/309, 482, 491, 487, 100

[56] References Cited

U.S. PATENT DOCUMENTS

| | | | |
|---|---|---|---|
| 4,810,948 | 3/1989 | Takuma | 323/280 |
| 5,193,198 | 3/1993 | Yokouchi . | |
| 5,376,834 | 12/1994 | Carobolante | 327/143 |

FOREIGN PATENT DOCUMENTS

| | | | |
|---|---|---|---|
| 3105198 | 9/1982 | Germany | H02J 4/00 |
| 3-100713 | 4/1991 | Japan | G06F 3/00 |
| 5-55701 | 7/1993 | Japan | B60L 1/00 |

*Primary Examiner*—Jack B. Harvey
*Assistant Examiner*—Rupal D. Dharia
*Attorney, Agent, or Firm*—Sughrue, Mion, Zinn, Macpeak & Seas, PLLC

[57] ABSTRACT

An input interface using a multiplex type input circuit for selecting a desired one, as its output, of a plurality of input power signals in accordance with a control signal generated by a CPU and for supplying the selected input power signal to an electronic element unit.

5 Claims, 9 Drawing Sheets

ON SWITCH 40a-1

ON・ON SWITCH 40a-2

POTENTIOMETER

INPUT INTERFACE USING MULTIPLEX TYPE INPUT CIRCUIT

BACKGROUND OF THE INVENTION

1. Field of the Invention

The present invention relates to an input interface using a multiplex type input circuit for selecting, as its output, a desired one of input signals generated by a plurality of signal sources respectively in accordance with a control signal and particularly relates to an input interface using a multiplex type input circuit for supplying a selected input power signal to a vehicle electronic element unit, such as a switching element, a variable resistance element, or the like.

2. Related Art

Conventionally, for example, that which is illustrated in FIG. 9 is known as an input interfaces of this type.

That is, as shown in the diagrams (a) to (c) of FIG. 9, individual input interfaces are provided for switching elements (an ON switch in the diagram (a) of FIG. 9 and an ON—ON switch in the diagram (b) of FIG. 9) and a variable resistance element (a potentiometer in the diagram (c) of FIG. 9), respectively.

In the ON switch, a charge voltage generated by a charge current flowing into a capacitor from a power supply (Vbat) through a resistor is measured at a first input port of a CPU to thereby detect the closed state of the ON switch.

Also in the ON—ON switch, respective charge currents of capacitors are measured at a second and third input ports of the CPU in the same manner as in the ON switch to thereby detect which one of terminal a and terminal b in the ON—ON switch is closed.

In the potentiometer, a charge current of a capacitor based on a partial potential generated by the proportion between a resistor connected to a power supply (5 V) and the potentiometer is measured at an A/D port to thereby measure the resistance value of the potentiometer.

Further, information of the respective addresses of the first, second, third and A/D ports is stored in the memory of the CPU.

In such a conventional input interface, however, individual input interfaces are provided for switching elements and a variable resistance element, respectively. There arises a problem that the scale of the circuit becomes large and therefore the cost increases correspondingly.

Furthermore, information of the respective addresses of the first, second, third and A/D ports is stored in the memory of the CPU. Accordingly, there arises a problem that the memory requires a large capacity.

SUMMARY OF THE INVENTION

The present invention has been achieved in view of the aforementioned problems in the prior art, and an object thereof is to provide an input interface using a multiplex type input circuit in which the input circuit is attained to be common to various kinds of electronic element units so that the input circuit can be simplified in configuration and reduced in cost.

In order to achieve such an object, the gist of the present invention is in each of the following items.

According to the present invention, an input interface using a multiplex type input circuit for selecting, as its output, a desired one of input signals respectively generated by a plurality of signal sources in accordance with a control signal, wherein the input interface comprises a multiplex type input circuit for selecting, as its output, a desired one of input power signals generated by a plurality of power supplies as the plurality of signal sources respectively, in accordance with a control signal.

An input interface according to the present invention, the input interface comprises a multiplex type input circuit for selecting, as its output, a desired one of the plurality of input power signals in accordance with a control signal generated by a CPU and for supplying the selected input power signal to an electronic element unit.

An input interface according to the present invention, characterized in that

- the electronic element unit performs predetermined electric conversion on the supplied input power signal and supplies the input power signal thus subjected to the electric conversion as a switching output signal to the CPU.

An input interface according to the present invention, the electronic element unit is a switching element or a variable resistance element;

- the switching element performs ON/OFF electric conversion on the supplied input power signal as the predetermined electric conversion, and supplies the input power signal thus subjected to the electric conversion, as a switching output signal, to the CPU; or
- the variable resistance element performs electric potential division on the supplied input power signal as the predetermined electric conversion, and supplies the input power signal thus subjected to the electric potential division, as a switching output, to the CPU.

An input interface according to the present invention:

- the multiplex type input circuit includes a first transistor, and a second transistor;
- the first transistor has an emitter connected to the power supplies, a collector connected to the electronic element unit to supply the input power signal to the electronic element unit, and a base connected to an collector of the second transistor, the emitter and base of the first transistor being connected to each other; and
- the second transistor has an emitter connected to the ground, a base connected to the CPU through a resistor, and the collector connected to the base of the first transistor.

A multiplex type input circuit provided in an input interface according to the present invention can select, as its output, a desired one of a plurality of input power signals so as to supply the selected input power signal to an electronic element unit.

The electronic element unit performs predetermined electric conversion on the input power signal supplied thereto so that the input power signal thus subjected to the electric conversion can be supplied as a switching output to a CPU.

That is, a switching element which is a kind of the electronic element unit performs ON/OFF electric conversion, as the predetermined electric conversion, on the supplied input power signal so that the input power signal thus subjected to the electric conversion can be supplied, as a switching output, to the CPU (specifically, to a first input port or a second input port).

Further, a variable resistance element which is a kind of the electronic element unit performs electric potential division of the supplied input power signal, as the predetermined electric conversion, so that the input power signal thus subjected to the electric potential division can be outputted as a switching output to be supplied to the CPU 30 (specifically, to an A/D port).

Because the input interface can be attained to be common to various kinds of electronic element units such as the switching element, the variable resistance element, and so on, the input interface can be simplified in configuration and reduced in cost.

Furthermore, because the number of input ports used can be reduced and the capacity of memory for storing information of the addresses of the ports can be reduced by sharing the input ports, the input interface can be simplified in configuration and reduced in cost.

The operation of the multiplex type input circuit according to the present invention will be described more in detail.

The input power signal is supplied to the collector of the first transistor Q1.

When a signal for turning on the second transistor Q2 is supplied from the output port of the, CPU, the first transistor is turned on by a bias voltage generated by the second transistor Q2 in ON-state. As a result, the input power signal can be supplied to the electronic element unit.

The electronic element unit performs predetermined electric conversion on the supplied input power signal, so that the input power signal thus subjected to the electric conversion can be outputted as a switching output to be supplied to the CPU.

As described above, in the input interface using the multiplex type input circuit according to the present invention, the input interface can be attained to be common to various kinds of electronic element units such as the switching element, the variable resistance element, and so on. Accordingly, the input interface can be simplified in configuration and therefore reduced in cost.

Furthermore, because the number of input ports used can be reduced and the capacity of memory for storing information of the addresses of the ports can be reduced by sharing the input ports, the input interface can be simplified in configuration and reduced in cost.

DETAILED DESCRIPTION OF THE PREFERRED EMBODIMENTS

An embodiment of the present invention will be described below with reference to the drawings.

Figure 1:
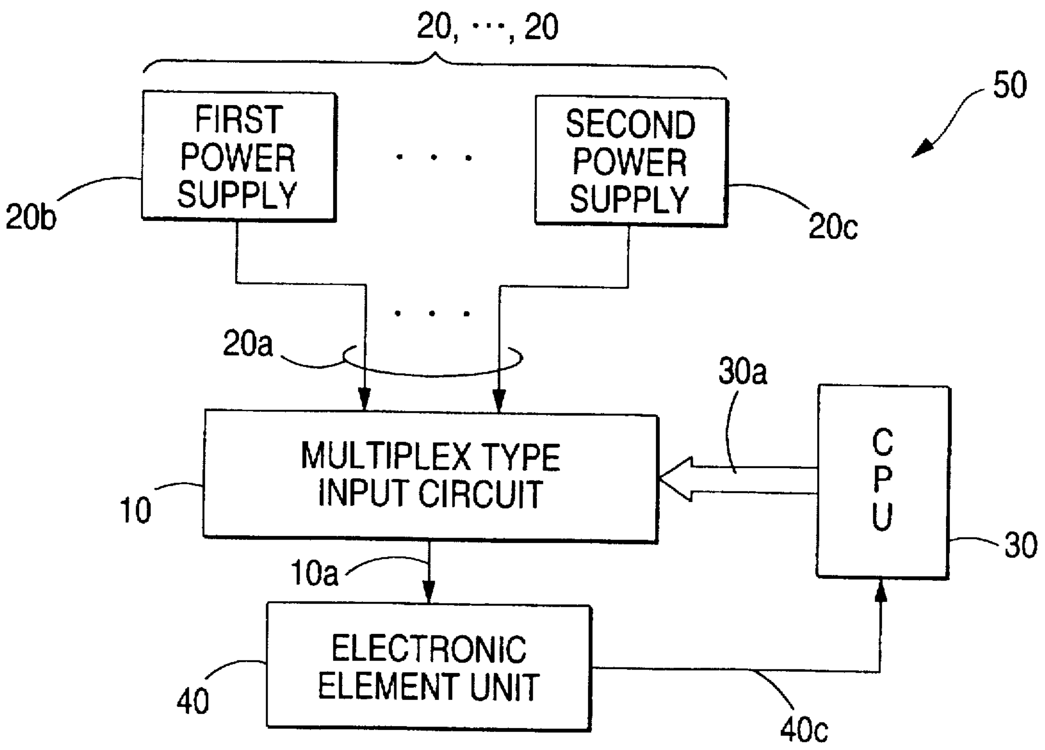
FIG. 1 is a functional block diagram showing an input interface using a multiplex type input circuit according to an embodiment of the present invention.
Figure 2:
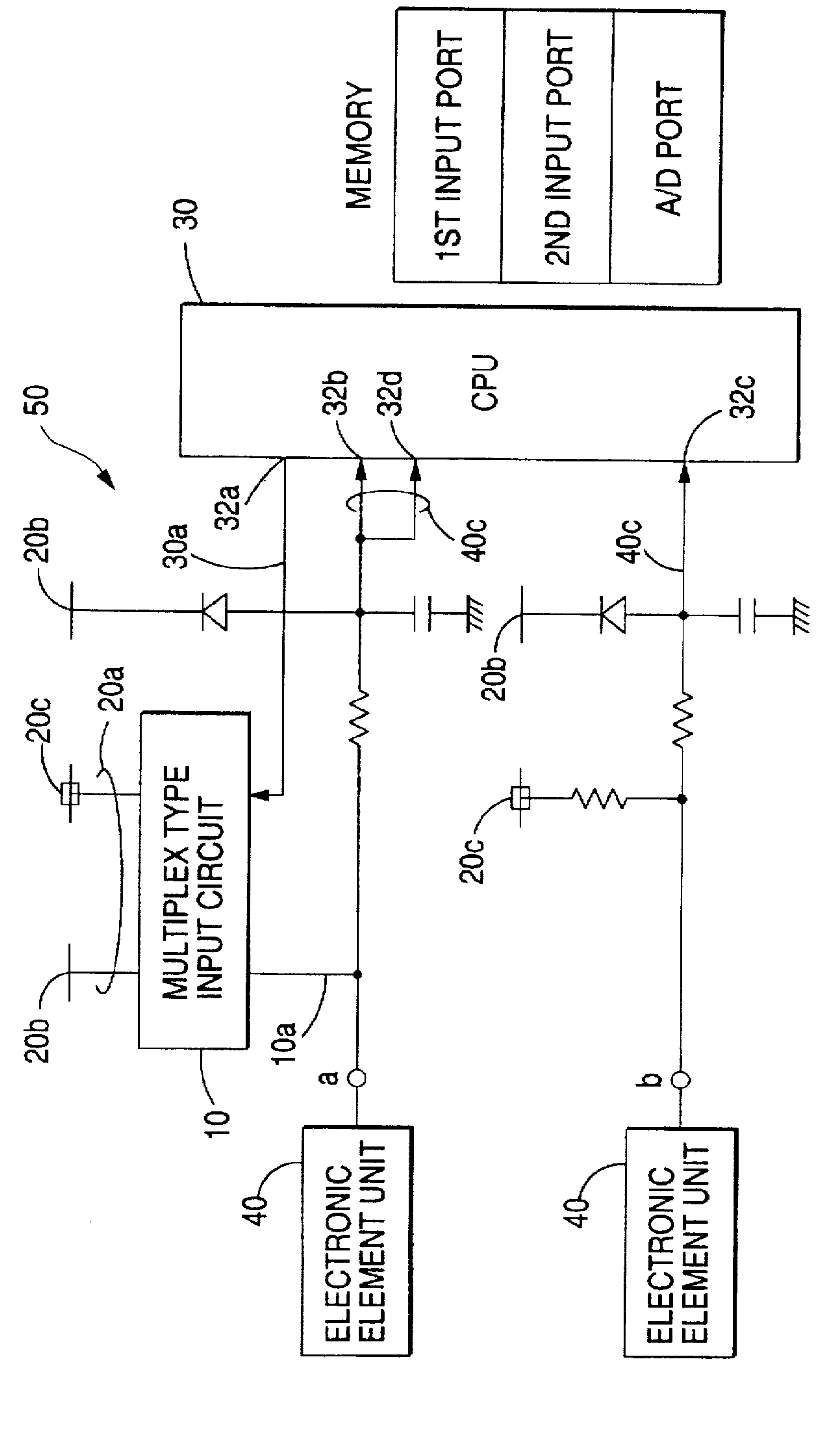
FIG. 2 is a diagram of arrangement of the input interface using the multiplex type input circuit according to the embodiment of the present invention.
Figure 3:
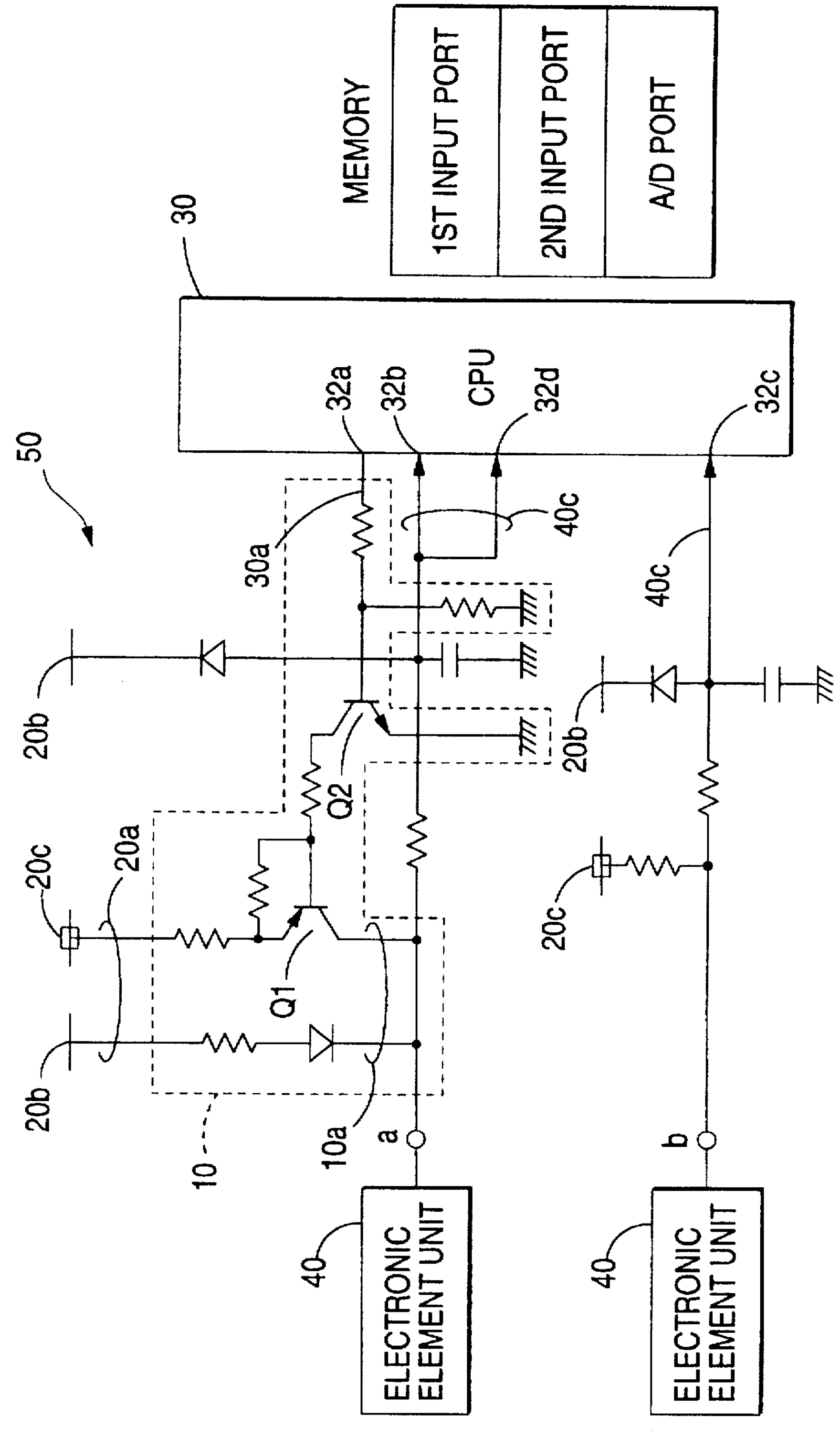
FIG. 3 is a circuit diagram of the input interface using the multiplex type input circuit according to the embodiment of the present invention.
Figure 4:
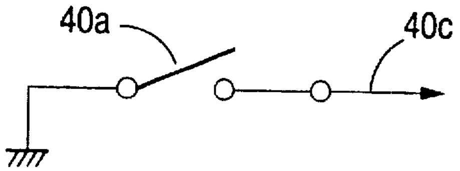
FIGS. 4(*a*) to 4(*c*) are circuit diagrams of various electronic element units according to the embodiment of the present invention.
Figure 4:
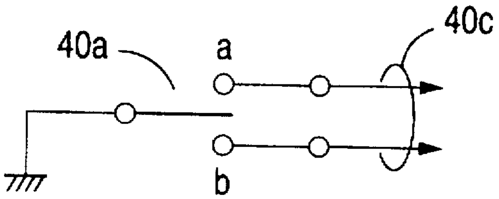
Figure 4:
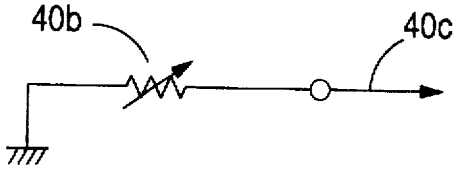

FIG. 1 is a functional block diagram showing an input interface 50 using a multiplex type input circuit 10 according to an embodiment of the present invention; FIG. 2 is a diagram of arrangement of the input interface 50 using the multiplex type input circuit 10 according to the embodiment of the present invention; FIG. 3 is a circuit diagram of the input interface 50 using the multiplex type input circuit 10 according to the embodiment of the present invention; and FIG. 4 is a circuit diagram of various electronic element units 40 according to the embodiment of the present invention.

As shown in FIG. 1, the input interface 50 in this embodiment has a multiplex type input circuit 10 for selecting, as its output, a desired one **20*a* of input power signals 20*a* generated respectively by a plurality of power supplies 20, . . . , 20 as signal sources, in accordance with a control signal 30*a***.

In this embodiment, the power supplies 20, . . . , 20 are a first power supply **20*b* (Va) and a second power supply 20*c*** (Vb) which are stabilized DC power supplies.

Further, as shown in FIGS. 1 and 2, the multiplex type input circuit 10 in this embodiment is connected both to a CPU 30 and to an electronic element unit 40 so that a desired one **10*a* of a plurality of input power signals 20*a* is selected, as its output, in accordance with a control signal 30*a* generated by the CPU 30, and the selected input power signal 10*a* is supplied to the electronic element unit 40**.

A specific example of the multiplex type input circuit 10 in this embodiment shown in FIGS. 1 and 2 is a circuit surrounded by the broken line in FIG. 3.

The specific example of the multiplex type input circuit 10 includes a first transistor (Q1) 12, and a second transistor (Q2) 14.

The first transistor (Q1) 12 has an emitter **12*a* connected to the power supplies 20, . . . , 20, a collector 12*c* connected to an electronic element unit 40 to supply input power signals 20*a* to the latter, and a base 12*b* connected to a collector 14*c* of the second transistor (Q2) 14. The emitter 12*a* and the base 12*b*** are connected to each other.

The second transistor (Q2) 14 has an emitter **14*a* connected to the ground, a base 14*b* connected to the CPU 30 through a resistor, and a collector 14*c* connected to the base 12*b* of the first transistor (Q1) 12**.

As shown in FIGS. 1 and 2, the CPU 30 is connected to the multiplex type input circuit 10 so as to supply a control signal **30*a* to the multiplex type input circuit 10, and so as to accelerate the selection of a desired input power signal 10*a* of the plurality of input power signals 20*a*** as its output.

As shown in FIG. 1, the electronic element unit 40 is connected to the multiplex type input circuit 10 and the CPU 30 so that the supplied input power signal **10*a* is subjected to predetermined electric conversion, and the input power signal 10*a* thus subjected to electric conversion can be outputted as a switching output 40*c* to be supplied to the CPU 30**.

Specifically, as shown in FIG. 2, a switching element **40*a* which is a kind of the electronic element unit 40 is connected to the multiplex type input circuit 10 and the CPU 30 so that ON/OFF electric conversion is performed as the predetermined electric conversion, on the supplied input power signal 10*a*, and the input power signal 10*a* thus subjected to the electric conversion can be outputted as a switching output 40***c* to supplied to the CPU 30.

As shown in the diagrams (a) and (b) of FIG. 4, examples of the switching element 40*a* in this embodiment an ON switch 40*a*-1, an ON—ON switch 40*a*-2, etc.

Similarly, a variable resistance element 40*b* which is a kind of the electronic element unit 40 is connected to the multiplex type input circuit 10 and the CPU 30 so that electric potential division of the supplied input power signal 10*a* is performed as the predetermined electric conversion, and the input power signal 10*a* thus subjected to the electric potential division can be outputted as a switching output 40*c* to be supplied to the CPU 30.

As shown in the diagram (c) of FIG. 4, examples of the variable resistance element 40*b* in this embodiment include a potentiometer, etc.

The operation of this embodiment will be described below.

Figure 5:
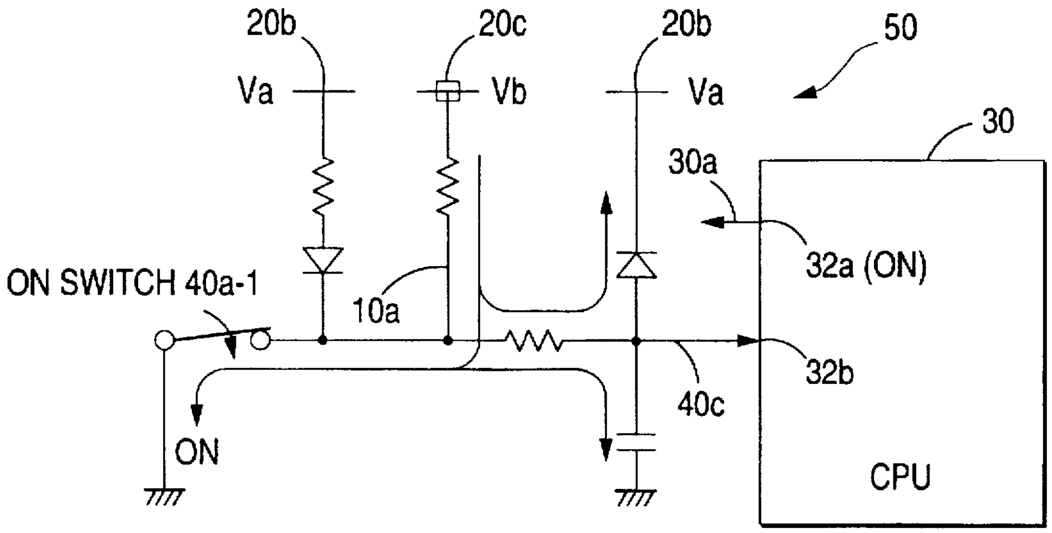
FIGS. 5(*a*) and 5(*b*) are circuit diagrams of the input interface using the multiplex type input circuit according to the embodiment of the present invention in the case where an output port is turned on by using an ON switch.
Figure 5:
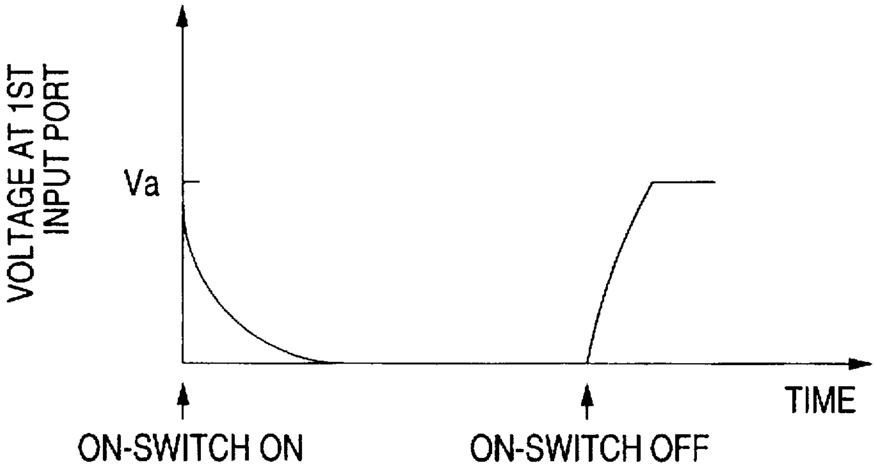
Figure 6:
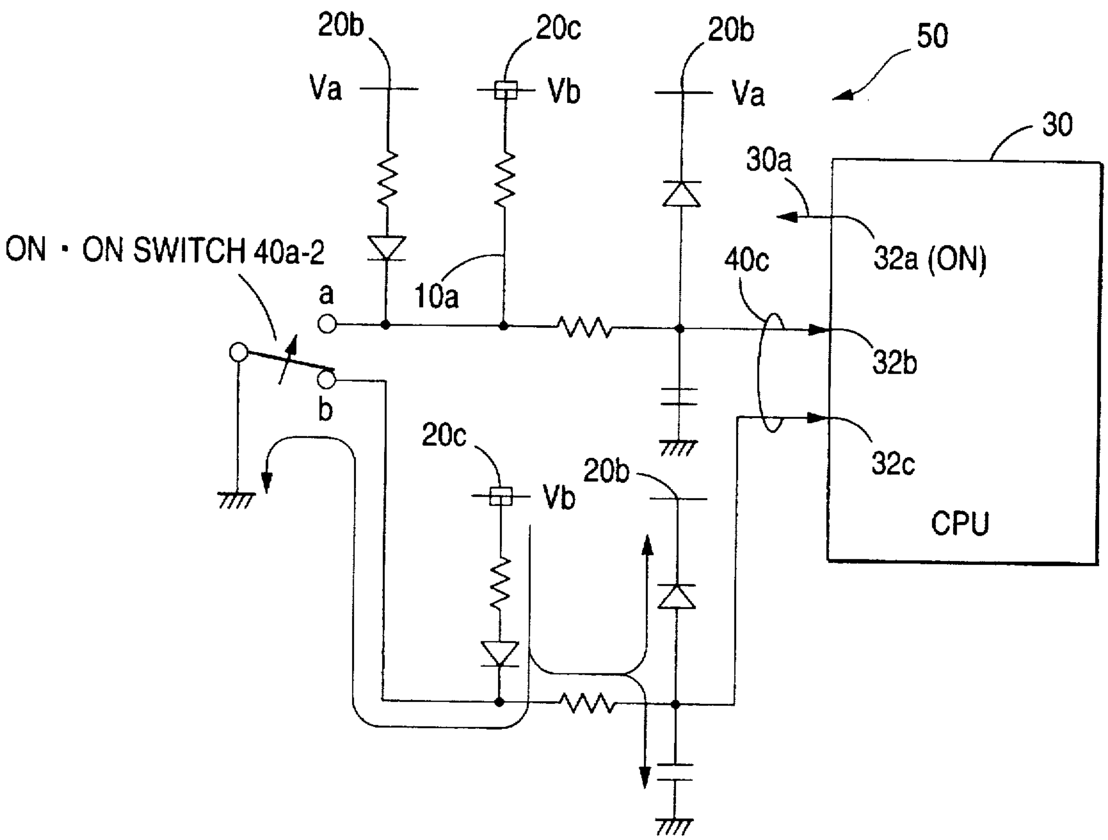
FIGS. 6(*a*) and 6(*b*) are circuit diagrams of the input interface using the multiplex type input circuit according to the embodiment of the present invention in the case where an output port is turned on by using an ON—ON switch.
Figure 6:
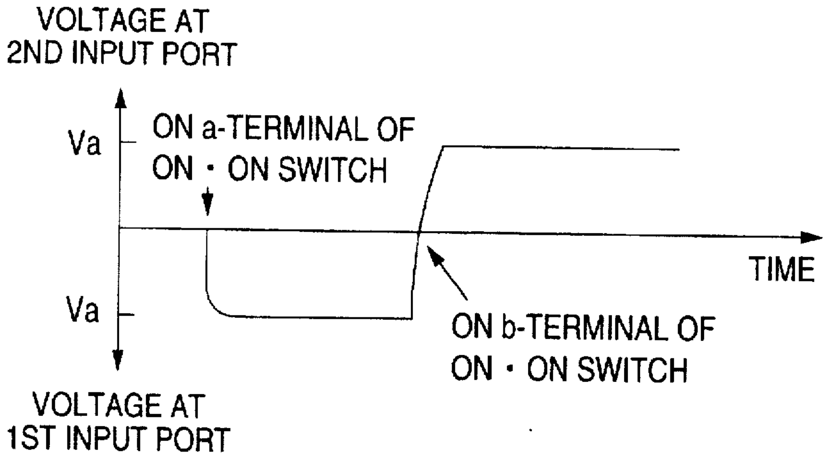
Figure 7:
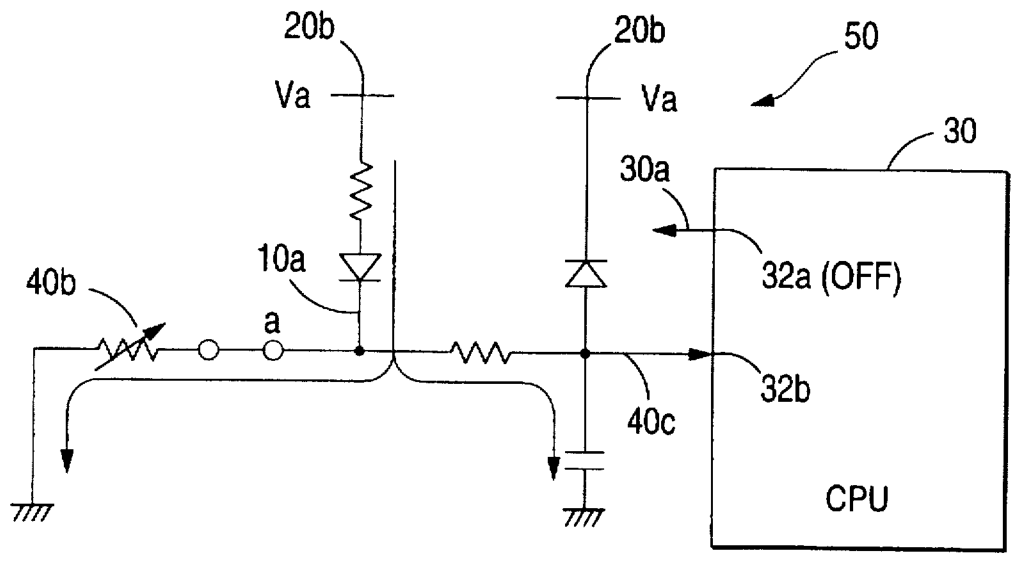
FIGS. 7(*a*) and 7(*b*) are circuit diagrams of the input interface using the multiplex type input circuit according to the embodiment of the present invention in the case where an output port is turned off by using a volume switch.
Figure 7:
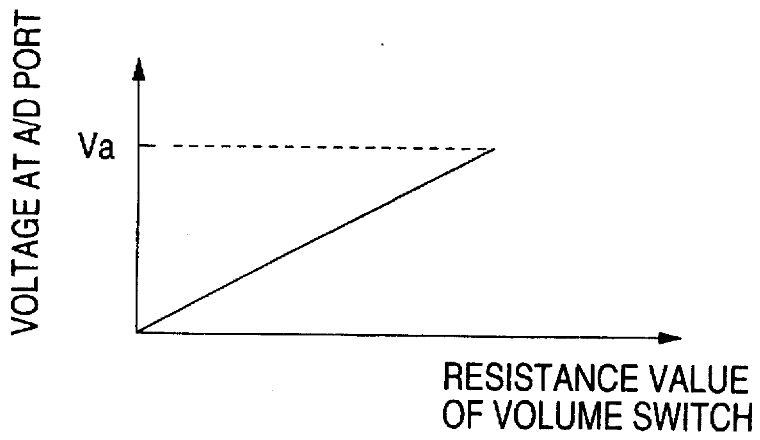

FIG. 5 is a circuit diagram of the input interface 50 using the multiplex type input circuit 10 according to the embodiment of the present invention in the case where the output port 32*a* is turned on by using the ON switch 40*a*-1; FIG. 6 is a circuit diagram of the input interface 50 using the multiplex type input circuit 10 according to the embodiment of the present invention in the case where the output port 32*a* is turned on by using the ON—ON switch 40*a*-2; and FIG. 7 is a circuit diagram of the input interface 50 using the multiplex type input circuit 10 according to the embodiment of the present invention in the case where the output port 32*a* is turned off by using a volume switch 40*b*.

Figure 8:
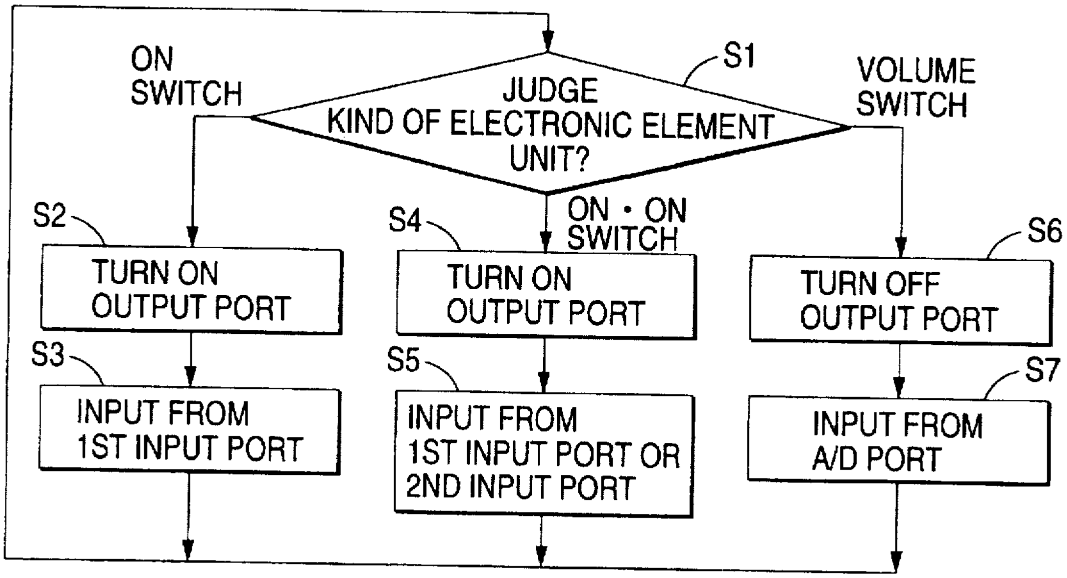
FIG. 8 is a flow chart of the input interface using the multiplex type input circuit according to the embodiment of the present invention.
Figure 9:
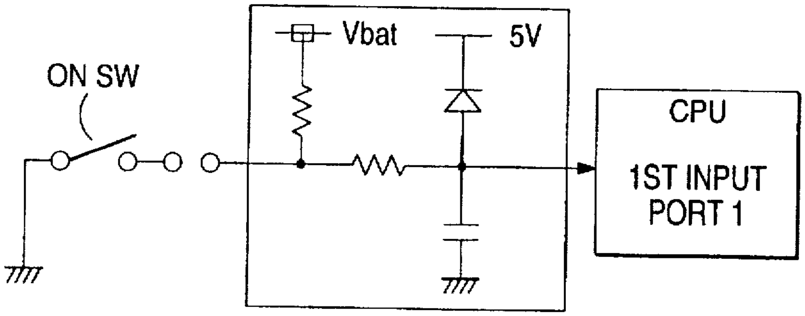
FIG. 9 (a) PRIOR ART
FIGS. 9(*a*) to 9(*c*) are functional block diagrams for explaining conventional input interfaces.
Figure 9:
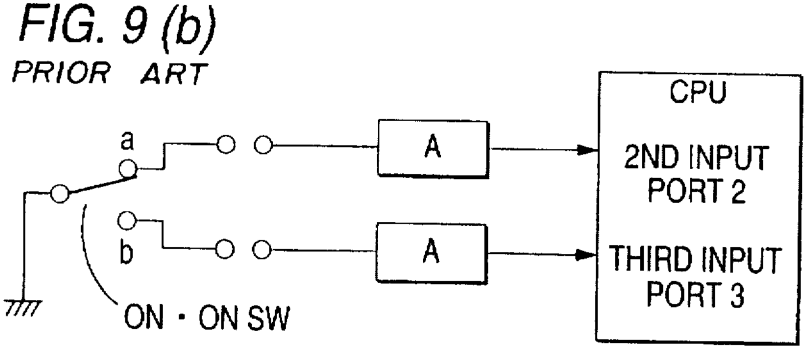
FIG. 9 (b) PRIOR ART
Figure 9:
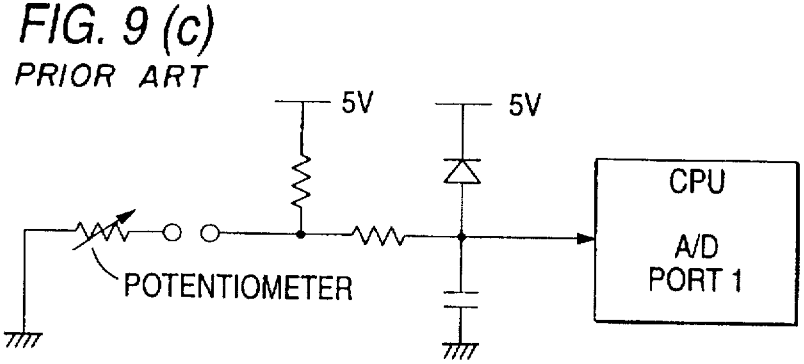
FIG. 9 (c) PRIOR ART
Figure 9:
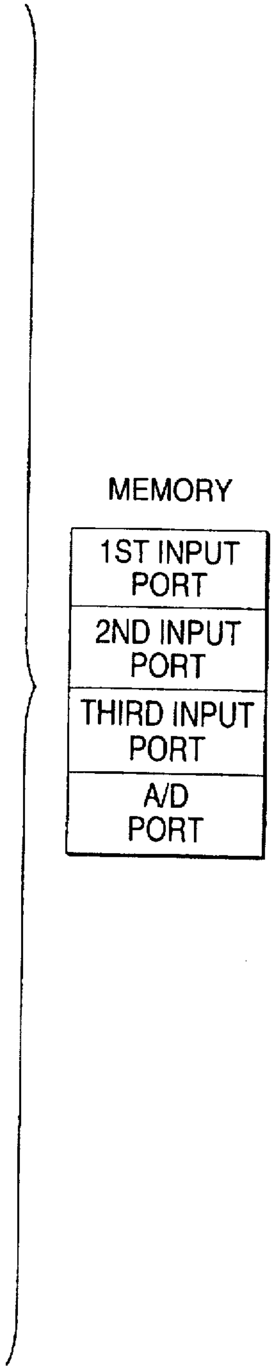
FIG. 9 (c) PRIOR ART

FIG. 8 is a flow chart of the input interface 50 using the multiplex type input circuit 10 according to the embodiment of the present invention.

Referring first to FIG. 4, the operation of the electronic element unit 40 in the embodiment will be described.

In this embodiment, the ON switch 40*a*-1, the ON—ON switch 40*a*-2 and the potentiometer 40*b* are used as the electronic element unit 40.

In this embodiment, the input power signal 10*a* is a DC voltage supplied from either one of the first and second power supplies 20*b* (Va) and 20*c* (Vb) which are stabilized DC power supplies.

The voltage of the first power supply 20*b* (Va) or the voltage of the second power supply 20*c* (Vb) is determined on the basis of the switching characteristic of the electronic element unit 40 connected and the input/output condition of the CPU 30. Particularly in this embodiment, the voltage of the first power supply 20*b* (Va) is set to be DC 5 V taking into account the A/D conversion input condition of the CPU 30, whereas the voltage of the second power supply 20*c* (Vb) is set to be DC 24 V taking into account the switching characteristics of the ON switch 40*a*-1 and the switching characteristic of the ON—ON switch 40*a*-2.

As shown in the diagram (a) of FIG. 4, the ON switch 40*a*-1 performs predetermined electric conversion on the supplied input power signal 10*a* (that is, Va or Vb) (in a state or in an opened state), so that the input power signal 10*a* thus subjected to the electric conversion can be outputted as a switching output 40*c* to be supplied to the CPU 30.

As shown in the diagram (b) of FIG. 4, the ON—ON switch 40*a*-2 performs predetermined electric conversion on the supplied input power signal 10*a* (that is, va or Vb) (in a closed state or in an opened state), so that the input power signal 10*a* thus subjected to the electric conversion can be outputted as a switching output 40*c* (that is, a signal indicating which one of terminals a and b is in a closed/opened state) to be supplied to the CPU 30.

That is, the switching element 40*a* which is a kind of the electronic element unit 40 performs ON/OFF electric conversion on the supplied input power signal 10*a* as predetermined electric conversion, so that the input power signal 10*a* thus subjected to the electric conversion can be outputted as a switching output 40*c* to be supplied to the CPU 30 (specifically, to the first and second input ports 32*b* and 32*c*).

As shown in the diagram (c) of FIG. 4, the potentiometer 40*b* performs predetermined electric conversion (that is, potential dividing conversion, for example, conversion into a desired voltage value in a range of from 0 V to Va (5 V)) on the supplied input power signal 10*a*, so that the input power signal 10*a* thus subjected to the electric conversion can be outputted as a switching output 40*c* (for example, a desired voltage value in a range of from 0 V to Va (5 V)) to be supplied to the CPU 30.

That is, the variable resistance element 40*b* which is a kind of the electronic element unit 40 performs electric potential division on the supplied input power signal 10*a* as predetermined electric conversion, so that the input power signal 10*a* thus subjected to the electric potential division can be outputted as a switching output 40*c* to be supplied to the CPU 30 (specifically, to the A/D port 32*d*).

Referring next to FIG. 8, the operation of the input interface 50 using the multiplex type input circuit 10 according to the embodiment of the present invention will be described.

The CPU 30 provided in the input interface 50 in this embodiment identifies the kind of the electronic element unit 40 in order to select a desired input power signal 10*a*, as the output of the multiplex type input circuit 10, of the plurality of input power signals 20*a* (in this embodiment, the DC voltage supplied from the first power supply 20*b* (Va) and the DC voltage supplied from the second power supply 20*c* (Vb)) (step S1).

In the case where the ON switch 40*a*-1 is connected, the selected input power signal 10*a* can be supplied to the electronic element unit 40 (that is, the ON switch 40*a*-1) by supplying an ON signal (in this embodiment, a high-level signal) to the output port 32*a* (step S2).

Succeedingly, the input power signal 10*a* is inputted from the first input port 32*b* (step 93) and then the situation of the routine goes back to the step S1.

In the case where the ON—ON switch 40*a*-2 is connected, the selected input power signal 10*a* can be supplied to the electronic element unit 40 (that is, the ON—ON switch 40*a*-2) by supplying an ON signal (in this embodiment, a high-level signal) to the output port 32*a* (step S4).

Succeedingly, the input power signal 10*a* is inputted from the first or second input port 32*b* or 32*c* (step S5) and then the situation of the routine goes back to the step S1.

In the case where the potentiometer 40*b* is connected, the selected input power signal 10*a* can be supplied to the electronic element unit 40 (that is, the potentiometer 40*b*) by supplying an OFF signal (in this embodiment, a low-level signal) to the output port 32*a* (step S6).

Succeedingly, the input power signal 10*a* (for example, a desired partial potential in a range of from DC 0 V to DC 5 V) is inputted from the A/D port 32*d* (step S7) and then the situation of the routine goes back to the step S1.

That is, because the input interface 50 can be attained to be common to various kinds of electronic element units 40 such as a switching element 40*a*, a variable resistance element 40*b*, and so on, the input interface 50 can be simplified in configuration and reduced in cost.

Furthermore, because the number of input ports used can be reduced and the capacity of memory for storing information of the addresses of the ports can be reduced by sharing the input ports 32*b*, 32*c* and 32*d*, the input interface 50 can be simplified in configuration and reduced in cost.

Referring next to FIGS. 5 through 7, the operation of the multiplex type input circuit 10 of the input interface 50 in this embodiment will be described more in detail.

FIG. 5 is a circuit diagram of the input interface 50 using the multiplex type input circuit 10 according to the embodiment of the present invention in the case where the output port 32*a* is turned on by using the ON switch 40*a*-1.

The CPU 30 supplies a control signal 32*a* (ON) (in this embodiment, a signal for turning on a transistor) to the output port 32*a*.

When the output port 32*a* is turned on, the second power supply (Vb) 20*c* is selected so that the input power signal 20*a* is supplied to the collector 12*c* of the first transistor (Q1) 12 as shown in the diagram (a) of FIG. 5.

When a signal for turning on the second transistor (Q2) 14 is given from the output port 32*a* of the CPU 30, the first transistor 12 is turned on by a bias voltage generated by the second transistor (Q2) 14 in ON-state. As a result, the input power signal 10*a* (in this embodiment, the DC voltage of the second power supply 20*c*) can be supplied to the electronic element unit 40 (in this embodiment, the ON switch 40*a*-1).

As shown in the diagram (b) of FIG. 5, the electronic element unit 40 (in this embodiment, the ON switch 40*a*-1) performs predetermined electric conversion (opening/closing) on the supplied input power signal 10*a* (in this embodiment, the DC voltage of the second power supply 20*c*), so that the input power signal 10*a* (in this embodiment, 0 (ground potential) or Vb (the DC voltage value of the second power supply 20*c*)) thus subjected to the electric conversion can be outputted as a switching output 40*c* to be supplied to the CPU 30.

FIG. 6 is a circuit diagram of the input interface 50 using the multiplex type input circuit 10 according to the embodiment of the present invention in the case where the output port 32*a* is turned on by using the ON—ON switch 40*a*-2.

The CPU 30 supplies a control signal 32*a* (ON) (in this embodiment, a signal for turning on a transistor) to the output port 32*a*.

When the output port 32*a* is turned on, the second power supply (Vb) 20*c* is selected so that the input power signal 20*a* is supplied to the collector 12*c* of the first transistor (Q1) 12 as shown in the diagram (a) of FIG. 6.

When a signal for turning on the second transistor (Q2) 14 is given from the output port 32*a* of the CPU 30, the first transistor 12 is turned on by a bias voltage generated by the second transistor (Q2) 14 in ON-state. As a result, the input power signal 10*a* (in this embodiment, the DC voltage of the second power supply 20*c*) can be supplied to the electronic element unit 40 (in this embodiment, the ON—ON switch 40*a*-2).

As shown in the diagram (b) of FIG. 6, the electronic element unit 40 (in this embodiment, the ON—ON switch 40*a*-2) performs predetermined electric conversion (opening/closing) on the supplied input power signal 10*a* (in this embodiment, the DC voltage of the second power supply 20*c*), so that the input power signal 10*a* thus subjected to the electric conversion can be outputted as a switching output 40*c* (that is, a signal indicating which one of the terminals a and b is in an opened/closed state) to be supplied to the CPU 30.

Next, FIG. 7 is a circuit diagram of the input interface 50 using the multiplex type input circuit 10 according to the embodiment of the present invention in the case where the output port 32*a* is turned off by using the volume switch 40*b*.

The CPU 30 supplies a control signal 32*a* (OFF) (in this embodiment, a signal for turning off a transistor) to the output port 32*a*.

When the output port 32*a* is turned off, both the first transistor (Q1) 12 and the second transistor (Q2) 14 are turned off so that the first power supply (Vb) 20*b* is selected as shown in the diagram (a) of FIG. 7.

When both the first transistor (Q1) 12 and the second transistor (Q2) 14 are turned off so that the first power supply (Va=DC 5 V) 20*b* is selected, the input power signal 10*a* (in this embodiment, the DC voltage of the first power supply 20*b*) can be supplied to the electronic element unit 40 (in this embodiment, the potentiometer 40*b*).

As shown in the diagram (b) of FIG. 7, the electronic element unit 40 (in this embodiment, the potentiometer 40*b*) performs predetermined electric conversion (that is, potential dividing conversion, for example, into a desired voltage value in a range of from 0 V to Va (5 V)), on the supplied input power signal 10*a*, so that the input power signal 10*a* (in this embodiment, the DC voltage value of the first power supply 20*b*) thus subjected to the electric conversion can be outputted as a switching output 40*c* (for example, a desired partial potential in a range of from 0 V to Va (5 V)) to be supplied to the CPU 30.

As described above, in the input interface 50 using the multiplex type input circuit 10 according to this embodiment, the input interface 50 can be attained to be common to various kinds of electronic element units 40 such as the switching element 40*a*, the variable resistance element 40*b*, and so on. Accordingly, the input interface 50 can be simplified in configuration and reduced in cost.

Furthermore, because the number of input ports used can be reduced and the capacity of memory for storing information of the addresses of the ports can be reduced by sharing the input ports 32*b*, 32*c* and 32*d*, the input interface 50 can be simplified in configuration and reduced in cost.

In the input interface using the multiplex type input circuit according to the present invention, because the input interface is provided with the multiplex type input circuit for selecting, as its output, a desired one of a plurality of input power signals in accordance with a control signal generated by a CPU and for supplying the thus selected input power signal to an electronic element unit, the input interface can be attained to be common to various kinds of electronic element units such as a switching element, a variable resistance element, and so on. Accordingly, the input interface can be simplified in configuration and reduced in cost.

Furthermore, because the number of input ports used can be reduced and the capacity of memory for storing information of the addresses of the A/D ports can be reduced by sharing the input ports, the input interface can be simplified in configuration and reduced in cost.

What is claimed is:

1. An input interface comprising:

a multiplex type input circuit for selecting, as its output, a desired one of input power signals generated by a plurality of power supplies, respectively, in accordance with a control signal;

said multiplex type input circuit including a first transistor and a second transistor, said first transistor has an emitter connected to said power supplies, a collector connected to an electronic element unit to supply said input power signal to said electronic element unit, and a base connected to a collector of said second transistor, said emitter and base of said first transistor being connected to each other, and said second transistor has an emitter connected to ground, a base connected to a CPU through a resistor, and said collector connected to said base of said first transistor.

2. An input interface according to claim 1, wherein said multiplex type input circuit selects, as its output, said desired one of said plurality of input power signals in accordance with said control signal which is generated by said CPU, and supplies said selected input power signal to said electronic element unit.

3. An input interface comprising:

an electronic element unit, and a multiplex type input circuit for selecting, as its output, a desired one of input power signals generated by a plurality of power supplies, respectively, in accordance with a control signal which is generated by a CPU, and for supplying said selected input power signal to said electronic element unit;

said electronic element unit performing predetermined electric conversion on said supplied input power signal and supplying the input power signal thus subjected to the electric conversion, as a switching output signal, to said CPU.

4. An input interface according to claim 3, wherein said electronic element unit is a switching element or a variable resistance element, said switching element performs ON/OFF electric conversion on said supplied input power signal as said predetermined electric conversion, and supplies the input power signal thus subjected to the electric conversion, as said switching output signal, to said CPU, and said variable resistance element performs electric potential division on said supplied input power signal as said predetermined electric conversion, and supplies the input power signal thus subjected to the electric potential division, as said switching output signal, to said CPU.

5. An input interface according to any one of claims 3 and 4, wherein said multiplex type input circuit includes a first transistor, and a second transistor, said first transistor has an emitter connected to said power supplies, a collector connected to said electronic element unit to supply said input power signal to said electronic element unit, and a base connected to a collector of said second transistor, said emitter and base of said first transistor being connected to each other, and said second transistor has an emitter connected to ground, a base connected to said CPU through a resistor, and said collector connected to said base of said first transistor.

* * * * *